J. R. ALBERTSON.
Potato-Planter.
No. 19,178.
Patented Jan. 26, 1858.
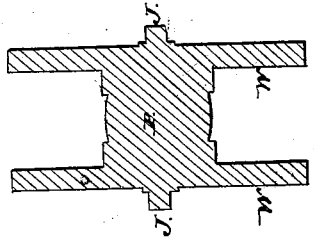
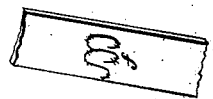
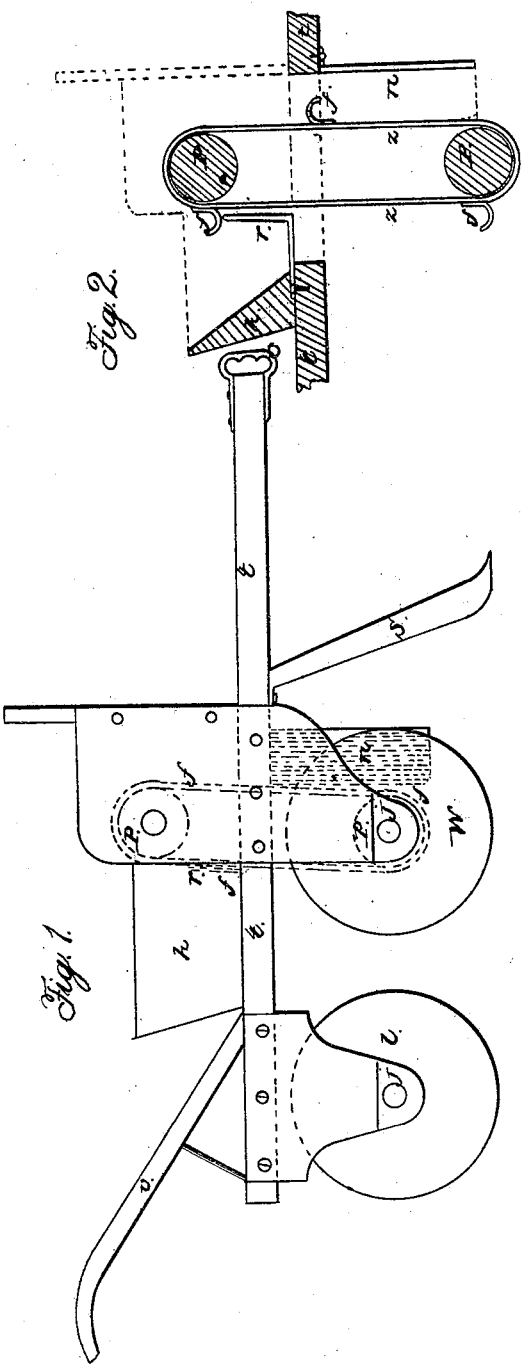

UNITED STATES PATENT OFFICE.

JOHN R. ALBERTSON, OF ALLEGHENY, PENNSYLVANIA.

IMPROVEMENT IN POTATO-PLANTERS.

Specification forming part of Letters Patent No. 19,178, dated January 26, 1858.

*To all whom it may concern:*

Be it known that I, JOHN R. ALBERTSON, of the city and county of Allegheny, in the State of Pennsylvania, have invented certain new and useful Improvements in Potato-Planters; and I do hereby declare that the following is a full and exact description thereof, reference being had to the accompanying drawings, and to the letters of reference marked thereon.

The nature of my invention consists in furnishing the front end of the hopper with rods so arranged as to allow the fingers on the belt to pass between them, said rods being used for the purpose of preventing the seed from rubbing against the belt, thereby avoiding friction, wearing, tearing, and slipping of the belt; and, also, in the arrangement of the belt with the fingers $f$, the pulleys $p$, the wheels $w$, and the depositing-tube $n$, said parts being so arranged that the seed is lifted from the hopper and carried up and deposited in the tube $n$, and there held by the fingers $f$ until it is the proper time to deposit the seed.

To enable others skilled in the art to make and use my improvement, I will proceed to describe its construction and operation.

In the accompanying drawings, Figure 1 represents the planter in all its parts combined. Fig. 2 represents a cut view of the hopper, belt, pulleys, fingers, and depositing-tube. Fig. 3 is a cut view of the lower pulley, front wheels, and axle. Fig. 4 represents a section of the belt with three of the fingers.

In the accompanying drawings, $t$ is the frame of the planter. $v$ are the handles. $h$ is the hopper. $p$ are the pulleys. $j$ are journals and journal-boxes. $f$ are the fingers for carrying up the seed. These are made of wire, and may be secured to the belt $z$ in such manner as suits the taste of the workmen. I have in the present case sewed them to the belt. The center fingers should always be placed lower than the side fingers. This will give them a dish form, and they will hold and lift the seed with more certainty. $r$ are the rods through which the fingers pass. $n$ is the depositing-tube, which conveys the seed to the desired place in the ground. $s$ is the share for opening the ground preparatory to the depositing of the seed. $l$ is a heavy cast-iron wheel used for the purpose of supporting the back part of the planter, and also for pressing the earth over the seed. $c$ is the clevis used in drawing or hauling the planter.

The operation of my planter is as follows: When the planter is put in motion the wheels $w$ drive the pulleys $p$, which support and move the belt, with the fingers $f$. The fingers lift the seed up from the hopper and convey it into the depositing-tube $n$. It is carried down the tube $n$ and dropped into the furrow made by the share $s$, and is covered up by the heavy cast wheel $l$.

It will be observed that the fingers $f$ are so arranged that the seed is held up on the back of the fingers in the tube $n$ until it is proper time to deposit.

The size of the various parts, and the material or stock used in constructing the same, I leave to the judgment of the mechanic skilled in the art.

The advantages of my improvement consist, first, in constructing and arranging the various parts so as to avoid complication; second, in the adaptation of the parts to the work to be performed; third, I economize labor by means of the simple arrangement of the various parts and in the construction of my improvement; fourth, I save time, labor, trouble, and expense in planting potatoes.

Having thus described the nature, construction, operation, and advantages of my improvement, what I claim as my invention, and desire to secure by Letters Patent, is—

The arrangement of belt $z$ and fingers $f$ with rods $r$ and hopper $h$, in the manner and for the purpose herein described.

JOHN R. ALBERTSON.

Witnesses:
ALEXANDER HAYS,
GEORGE P. STECK.